(12) United States Patent
Chen

(10) Patent No.: US 6,412,036 B1
(45) Date of Patent: Jun. 25, 2002

(54) APPARATUS FOR TESTING INPUT/OUTPUT INTERFACE OF COMPUTER SYSTEM

(75) Inventor: Ching-Hua Chen, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 09/220,553

(22) Filed: Dec. 23, 1998

(30) Foreign Application Priority Data

Apr. 1, 1998 (TW) .......................................... 87204814

(51) Int. Cl.[7] .............................................. G06F 13/00
(52) U.S. Cl. ...................................... 710/305; 710/106
(58) Field of Search ............................. 714/42, 43, 46, 714/47, 18, 23, 29, 30, 31, 37; 710/101, 102, 103, 106, 305

(56) References Cited

U.S. PATENT DOCUMENTS

| | | | | |
|---|---|---|---|---|
| 4,057,847 A | * | 11/1977 | Lowell et al. ............... | 364/200 |
| 5,029,168 A | * | 7/1991 | Chan ......................... | 371/16.1 |
| 5,237,663 A | * | 8/1993 | Srinivasan ................... | 395/325 |
| 5,734,685 A | * | 3/1998 | Bedell et al. ................ | 375/356 |
| 5,920,898 A | * | 7/1999 | Bolyn et al. ................. | 711/167 |

\* cited by examiner

*Primary Examiner*—Peter Wong
*Assistant Examiner*—Tim Vo
(74) *Attorney, Agent, or Firm*—Rabin & Berdo, P.C.

(57) ABSTRACT

The invention provides an apparatus for testing input/output (I/O) interface in a computer system. The apparatus is capable of testing the I/O interface under real distance condition. The apparatus communicates with a first I/O interface in the computer system via a signal medium. The test apparatus includes a memory means, a clock generator for outputting a clock signal, an I/O interface communicating with the first I/O interface in the computer system via the signal medium, and a controller connected to the I/O interface. The controller operates synchronously with the clock signal for writing data transmitted from the I/O interface into the memory means, or reading out the data from the memory means and then transmitting the data to the first I/O interface through the I/O interface when a predetermined condition becomes effective.

4 Claims, 2 Drawing Sheets

APPARATUS FOR TESTING INPUT/OUTPUT INTERFACE OF COMPUTER SYSTEM

FIELD OF INVENTION

The present invention relates to an apparatus for testing an I/O interface of a computer system, and especially, to a test apparatus with capability of emulation of the real distance environment.

BACKGROUND OF INVENTION

With respect to the testing of I/O interfaces in a computer system, a well-known loopback approach is utilized in general. The loopback approach is described as follows. In a function test of an I/O interface of a computer, a test apparatus is connected to the I/O interface of the computer. When the computer outputs a set of data via the I/O interface, the test apparatus receives and sends directly the set of data back to the I/O interface. The I/O interface then sends the set of data to the computer to determine whether the I/O interface works normally. If no difference between the output data and the return data is decided, the function of the I/O interface will be considered to meet the design requirement. In general, an I/O interface in a computer system, such as an infra-red (IR) interface, or a RS-232 interface, or a network interface, requires the function test as mentioned above.

However, according to the practical experiences, the I/O interface, which pass the function test by the loopback approach, may still malfunction under actual operation environment. The cause is the environment of the loopback approach cannot accurately reflect the I/O interface under the real distance condition. Therefore, a more conservative approach is to transmit signals to a test apparatus and then to send the signals back after a delay. The environment of the approach is much close to the I/O interface under the real distance condition.

The concept and spirit of this present invention are applicable to the function test of an IR interface, a RS-232 interface, and a network interface.

SUMMARY OF INVENTION

The invention provides an apparatus for testing an I/O interface in a computer system, e.g., an IR interface, or a RS-232 interface, or a network interface. The test apparatus is capable of testing the I/O interface under the real distance condition.

According to this invention, the test apparatus communicates with a first I/O interface in the computer system via a signal intermediary. The test apparatus includes a memory means, a clock generator for outputting a clock signal, an I/O interface communicating with the first I/O interface in the computer system via the signal medium, and a controller connected to the I/O interface. The controller synchronously operates with the clock signal. The clock signal drives the controller for writing data transmitted from the first I/O interface into the memory means, or reading out the data from the memory means and then transmitting to the first I/O interface through the I/O interface when a predetermined condition becomes effective.

BRIEF DESCRIPTION OF THE APPENDED DRAWINGS

DETAILED DESCRIPTION OF THE INVENTION

Figure 1:
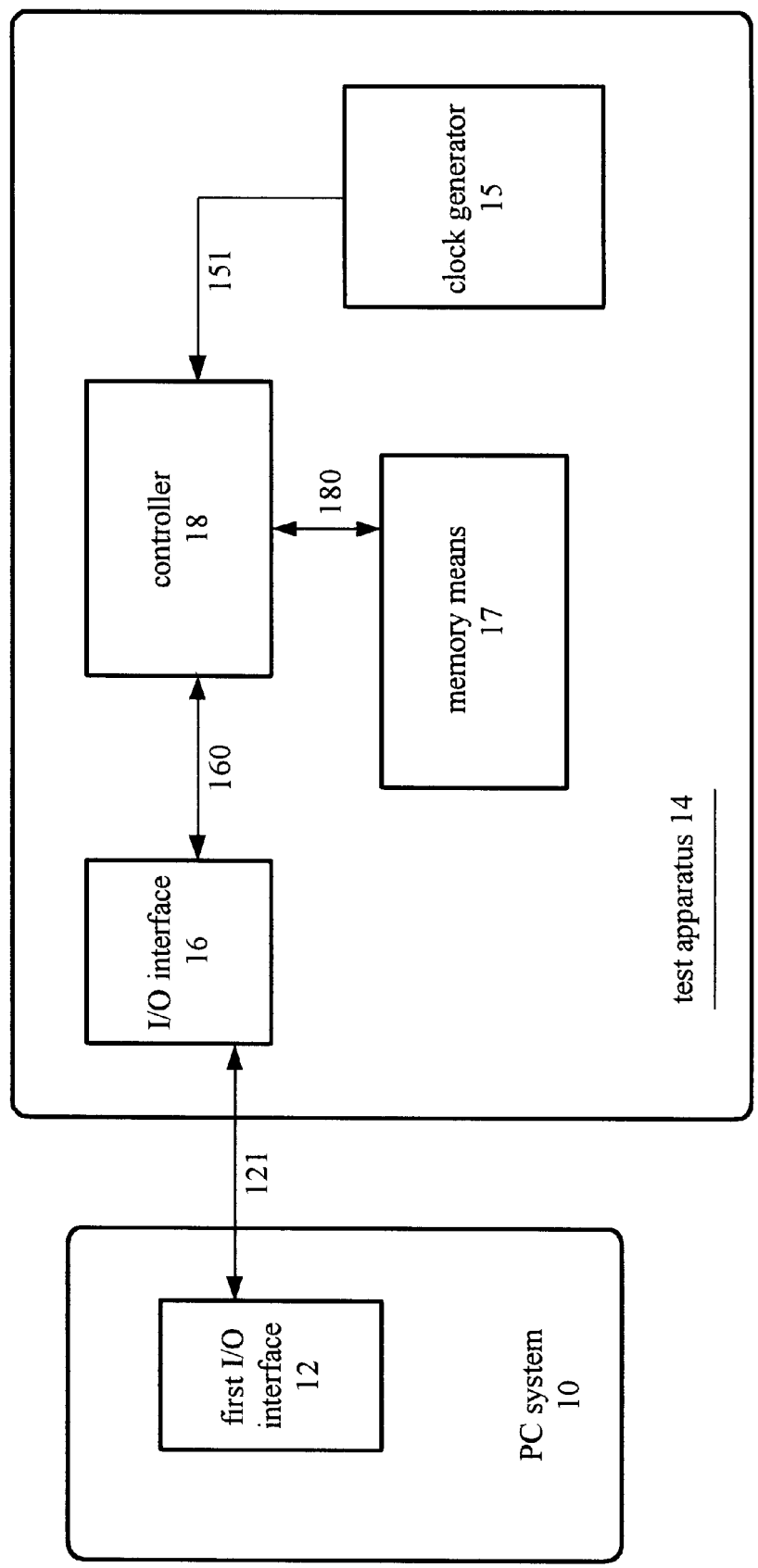
FIG. 1 is a block diagram revealing the concept of the invention.

The basic concept of the invention is introduced first, and in the following the invention is further explained by an embodiment of the function test of an IR interface. Referring to FIG. 1, a test apparatus 14, according to the invention, communicates with a computer system 10 and an I/O interface 12 thereof via a signal medium 121. The signal medium 121 may be a wire signal, such as a signal on a RS-232 line, or a signal on a network line, or may be a wireless signal, such as an infra-red (IR) signal. In the test, a test program (not shown) in the computer system 10 instructs the computer system 10 to output a predetermined set of data through the I/O interface 12. Afterward, through the I/O interface 16, the test apparatus 14 sends the set of data back to the I/O interface 12 and the computer 10. The test program then decides whether the function of the I/O interface 12 operates accurately. As described as follows, compared with the conventional approach, the test apparatus 14 in this invention is much capable of emulating the actual I/O transmission condition.

In details, the test apparatus 14 includes a controller 18, an I/O interface 16, a clock generator 15, and a memory means 17. In an embodiment, the controller 18 can be a programmable logic device (PLD), and the memory means can be a high speed static random access memory (SRAM). The I/O interface 16 communicates with the I/O interface 12 in the computer system 10 via the signal medium 121. The clock generator 15 outputs a clock signal 151 to synchronize the controller 18. The controller 18, responsive to the clock signal 151, writes the data, transmitted from through the signal line 160, into the memory means 17 one by one. When a predetermined condition becomes effective, the controller 18 reads out the data stored in the memory means 17, and then sends the read-out data to the I/O interface 12 through the signal line 160. The controller 18 determines and controls the function relationship between the data sent back through the signal line 160 and the data stored in the memory means 17.

From the configuration of this invention, it is evident that the output data from the computer system 10 are stored in the memory means 17 through the signal line 160 and the signal line 180, and then are sent back to the computer system 10 from the memory means 17 through the signal line 180 and the signal line 160. Since delay is involved during testing, the invention is much capable of reflecting the actual transmission condition and is prevailing to the conventional loopback approach.

Figure 2:
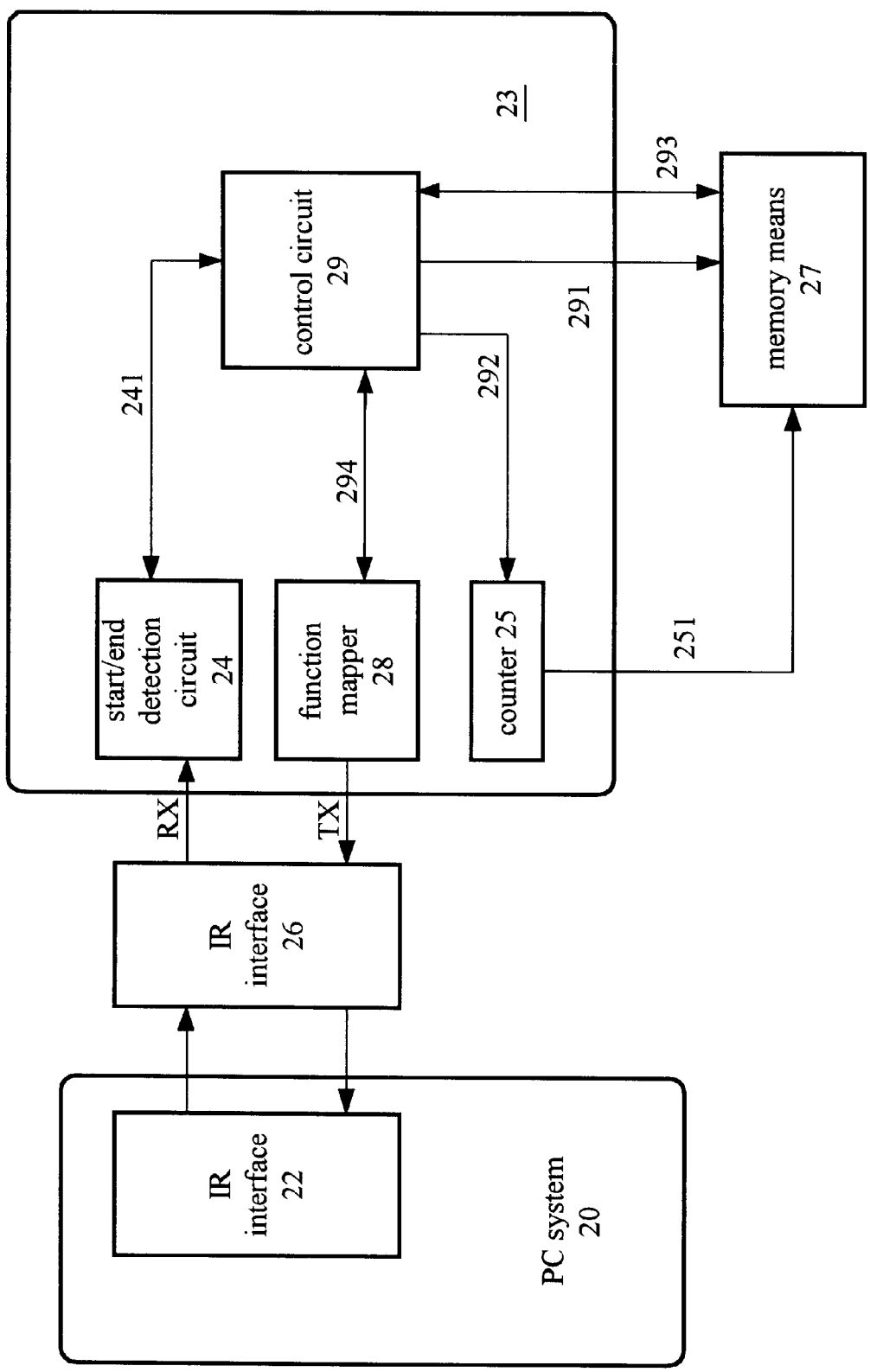
FIG. 2 shows an embodiment of the invention applied the function test of an IR interface.

Referring to FIG. 2, an embodiment of the invention applied to the function test of an IR interface 22 is shown. To the function test of the IR interface, a controller 23 includes a control circuit 29, a start/end detection circuit 24, a function mapper 28, and a counter 25. An IR interface 26 communicates with the IR interface 22 in the computer system 20. The data received by the IR interface 26 are transmitted to the controller 23 through a RX line, and the data sent out from the controller 23 are transmitted to the I/R interface 22 through a TX line and the IR interface 26.

The start/end detection circuit 24 is capable of detecting the start moment and end moment of the data transmitting on the RX line, and notifying the control circuit 29 of the start/end moment. The control circuit 29 issues a reset signal 292 and a control signal 291 including the signals such as the chip select (CS) signals and the read/write (R/W) control signals. The signals 293 are the data signals. The control circuit 29 writes in the received data or reads out the stored data through the signals 293. The control circuit 29 sends the read-out data to the function mapper 28 through a signal line 294. The clock signal 251 are provided to the components 25, 29, 24, and 28, etc. The counter 25 outputs an address signal to the memory means 27. The address signal is used by the controller 23 to write in or read out the data.

While detecting the start of the data flow, the start/end detection circuit 24 notifies the control circuit 29 through a signal line 241. The control circuit 29 sends the reset signal 292 to reset the counter 25 to start counting. At the same time, the control circuit 29 sends the control signal 291 to notify the memory means 27 of a write action, and the data are stored in the memory means 27 one by one through the signal line 293 during this period.

While detecting the end of the data flow, the start/end detection circuit 24 notifies the control circuit 29 through the signal 241. The control circuit 29 sends the reset signal 292 to reset the counter 25 to start counting. The control circuit 29 sends the control signal 291 to notify the memory means 27 of a memory read action. At the same time, the function mapper 28 starts working to process the data by a function. The post-process data are then sent to the I/O interface 26 through the TX signal line. Sequentially, the I/O interface 26 sends the data in IR type back to the I/O interface 22.

As arranged in FIG. 2, the invention can perform the test of the IR interface for various IR transmission protocols, such as the standard speed IR protocol, the middle speed IR protocol, and the high speed IR protocol.

The function mapper 28, mentioned above, generally performs the transformation of voltage level of the data, or other type of transformation according to actual requirement.

What is claimed is:

1. An apparatus for testing I/O interface in a computer system, said apparatus communicating with said computer system and a first I/O interface in said computer system via a signal medium, said apparatus comprising:

a memory means;

a clock generator for outputting a clock signal;

an I/O interface, said I/O interface communicating with said first I/O interface in said computer system via said signal medium; and a controller, said controller being connected to said I/O interface and synchronizing with the clock signal, said controller, under control of the clock signal, writing data transmitted from said I/O interface into said memory means, said controller reading out the data stored in said memory means and then transmitting the data to said first I/O interface through said I/O interface when a predetermined condition becomes effective;

wherein said controller includes:

a start/end detection circuit, wherein the data received by said I/O interface is transmitted to said start/end detection circuit through a RX signal line, and said start/end detection circuit detects a start moment and an end moment of the data on said RX signal line and sends out a status signal;

a function mapper, said function mapper transmitting the data of said controller to said first I/O interface through a TX signal line and said I/O interface;

a control circuit, said control circuit, in response to said status signal, sending out a reset signal;

a counter, said counter, in response to said reset signal, outputting an address signal to said memory means for writing data into said memory means or reading out data from said memory means.

2. The apparatus of claim 1, wherein said signal medium is an infra-red signal.

3. The apparatus of claim 1, wherein said controller is a programmable logic device.

4. The apparatus of claim 1, wherein said memory means is a high speed SRAM.

* * * * *